March 10, 1970 — C. M. DE WOODY — 3,499,670

FLEXIBLE PRESSURE-TYPE JOINT FOR RIGID TUBING

Filed Oct. 6, 1967

INVENTOR
CHARLES M. DeWOODY

BY

ATTORNEY

United States Patent Office

3,499,670
Patented Mar. 10, 1970

3,499,670
FLEXIBLE PRESSURE-TYPE JOINT FOR RIGID TUBING
Charles M. De Woody, Vineland, N.J., assignor to Ace Glass Incorporated, Vineland, N.J., a corporation of New Jersey
Filed Oct. 6, 1967, Ser. No. 673,376
Int. Cl. F16l 19/02, 49/00
U.S. Cl. 285—355                           8 Claims

ABSTRACT OF THE DISCLOSURE

A high pressure coupling for joining sections of glass tubing and providing for substantial relative angular movement of the joined sections while, at the same time, maintaining a pressure-tight seal. The glass tubing is internally threaded, and a substantially cylindrical coupling element, formed of non-scratching rigid plastics material, softer than the glass of the tubing and having an integral, central, annular flange, terminates at opposite ends in externally threaded nipples. The threads of the nipples are of sufficiently reduced dimensions with respect to those of said glass elements to provide an annular clearance with the tubing threads, so as to permit relative angular movement of the coupled tubing sections. Compressible, annular seals are interposed between the threaded ends of respective tubing sections and the adjacent faces of the central flange to insure a tight seal, despite relative angular movement of the coupled sections.

BACKGROUND OF INVENTION

In the past, there have been problems in securing a true pressure-tight seal when coupling two sections of glass tubing, such for example, as used in laboratories and chemical systems. Ground conical couplings require springs which must be of a low tension and, therefore, tend to blow out readily.

A ground ball and socket joint is fastened together with a clamp, and if sufficient pressure is exerted on the glass to create a seal which is effective at more than 75 lbs. p.s.i.g., the rate of breakage is very significant.

Flange-type joints are very limited in flexibility, and also are prone to breakage from over-tightening the clamp to make seals effective at over 50 lbs. p.s.i.g.

Flexible joints which rely on the flexibility of the threaded coupling elements per se for angular relative movement, will deform sufficiently to form a leak path and do not provide sufficient thread shear force resistance.

SUMMARY

In glass chemical equipment, a certain degree of angular flexibility is necessary to compensate for thermal expansion and misalignment of equipment for feeding from reservoirs into reactors and the like. The joint of the present invention provides increased angular flexibility, reduces breakage, and insures a tight seal at pressures over 200 lbs. p.s.i.g., which is above the normal operating pressures for glass standard wall pipe equipment.

Two internally threaded sections of glass tubing are coupled by a substantially cylindrical element formed of a plastic material or filled plastics material softer than the glass tubing, and having a central, annular, radial flange which terminates axially at opposite ends in externally threaded nipples. The external threads of the nipples are of sufficiently reduced dimensions with respect to the internal threads of the glass tubing to provide an annular clearance which permits substantial angular relative movement of the glass tubing. Annular compressible seals are interposed between the ends of the glass tubing and the adjacent faces of the respective central flange.

THE DRAWINGS

Referring to the drawings in which numerals of like character designate similar parts throughout the several views.

DETAILED DESCRIPTION

Figure 1:
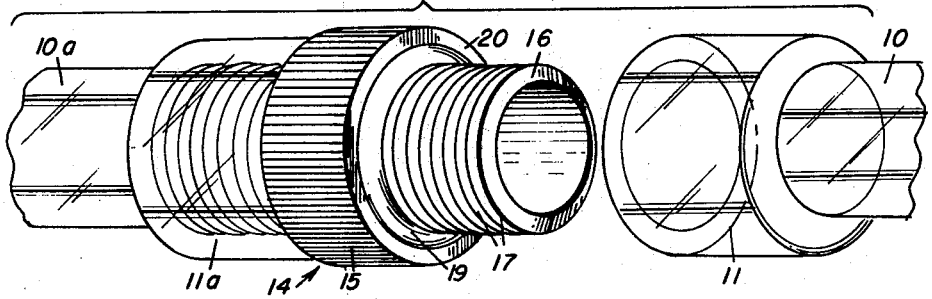
FIG. 1 is an exploded, fragmentary, perspective illustrating the parts of the joint.
Figure 2:
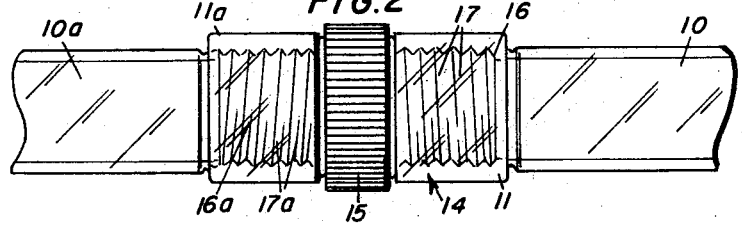
FIG. 2 is a view in side elevation showing the assembled joint with the two coupled sections of glass tubing axially aligned.
Figure 3:
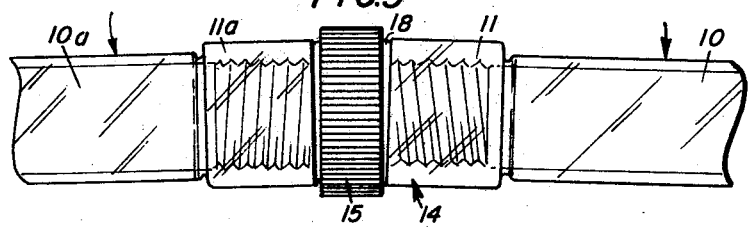
FIG. 3 is a similar view illustrating the relative angular movement of the two sections of tubing.

In the drawings 10 and 10a represent two sections of glass tubing to be coupled. In the form of the invention illustrated, these sections of tubing respectively terminate at one end in bell portions 11, 11a, which are internally threaded as at 12, FIGS. 4 and 5. While the invention is primarily concerned with the coupling of sections of glass tubing, it may be noted that rigid tubing formed of suitable plastics and other materials is also contemplated, and, therefore, in the claims, the terms "glass" and "rigid" are intended to also embrace these other materials.

The coupling element of the invention is generally indicated at 14, and comprises an annular, radial flange 15 which terminates axially at opposite ends in integral, externally threaded nipples 16 and 16a. The coupling is preferably formed of such plastics as nylon, polytetrafluoroethylene (Teflon®), polytrifluorochloroethylene (Kel-F®), and the like although hard rubber or other suitable material may be employed. Hence, in the claims, the term "plastics material" is intended to include both plastics of the type above referred to, as well as hard rubber and other suitable material including filled plastics so long as its surface does not abrade the mating threads.

Figure 4:
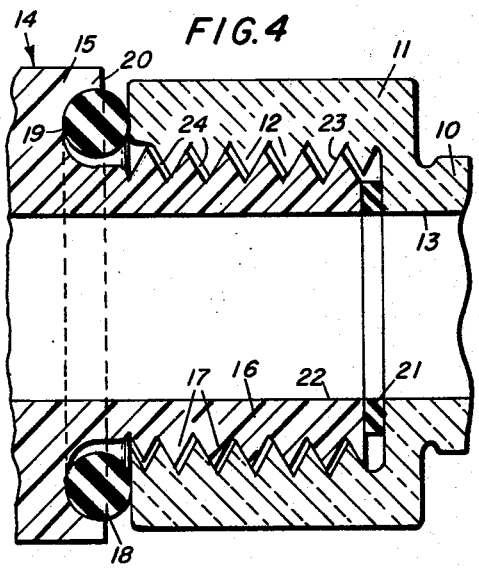
FIG. 4 is an enlarged, longitudinal, sectional view, illustrating the differences in the respective thread dimensions of a tube section and coupling nipple.
Figure 5:
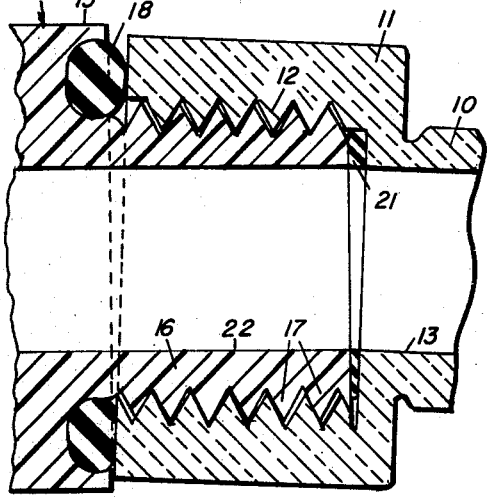
FIG. 5 is a similar view showing a section of tubing undergoing relative angular movement.

The nipples 16 and 16a are externally threaded as at 17, and, as best seen in FIG. 4, the nipple threads are of sufficiently reduced dimensions with respect to the internal threads 12 of the bell 11, to permit relative angular movement of the coupled tubing sections, as seen in FIG. 5. The difference between the thread dimensions of the nipple and bell can vary so long as there is an area of threaded engagement of a minimum depth of ½ a thread, which is sufficient to provide mechanical thread shear force resistance to effect tight engagement of the threads when the joint is completely assembled. Also, the respective thread contours may differ, that is, one can be curved in cross-section, and the other V-shaped, provided there is a sufficient area of threaded engagement.

Opposite faces of the annular flange 15 are recessed as at 19 to receive suitable seals, such as the O-rings 18 shown in the drawing. The annular lips 20 of the recesses 19 are longitudinally offset from the corresponding ends of the bells 11 so as to accommodate the required relative movement in the angular adjustment of the tubing sections. The cross-sectional contour of the grooves 19 is semi-elliptical so that the inner edges of the lips 20 overlie the outer peripheries of the O-rings 18 to retain them in place, while, at the same time, accommodating the deformation of the rings under compression when the tubing sections are undergoing relative angular adjustment, as best seen in FIG. 5.

Preferably, the bores 13 of the tubing sections 10, 10a are of the same diameter as the bore 22 of the nipples 16, 16a, so as to avoid any restriction of flow through the joint.

In addition to the O-rings 18, supplemental sealing rings 21 of compressible material may be employed between the bases of the bells 11, 11a and the adjacent ends of the nipples 16, 16a.

It is also conceivable that in a modified adaptation of the invention, the reduced male threads 17 of the nipples 16, 16a may be coated with a compressible substance, substantially filling the intervening spaces between the complementary threads, so that the joint relies on the compressibility of this material for angular flexing of the coupled tubing sections.

As previously noted, the difference in dimensions of the coacting threads 12 and 17 is controlled so as to maintain a mechanical thread shear force resistance as at 23 in FIG. 4, and the material of which the coupling element 14 is formed must be sufficiently stiff and non-flexible to provide such mechanical thread shear force resistance as to effect a tight engagement of the threads. Thus, when the bell 11 is screwed onto the nipple 16, a tight threaded engagement is effected to insure a tight compression and sealing engagement with the O-ring 18. However, upon angular movement of the tubing section 10 with respect to the coupling element, the spaces 24 between the non-contacting areas of the threads, accommodate the angular adjustment of the tubing sections on the nipples, while a tight seal is maintained between the bell and the flange by virtue of the compressible O-ring 18.

The present invention provides an angularly adjustable joint which will insure a tight seal at high pressures of from 15 p.s.i. to the order of 200 p.s.i.

It will be apparent that the joint of the present invention clearly distinguishes and represents an improvement over purely flexible coupling elements which rely entirely on their flexibility for angular adjustment. As before pointed out, a wholly flexible coupling element deforms sufficiently to form a leak path, and, furthermore, would not provide the necessary thread shear force resistance.

From the foregoing, it is believed that the invention may be readily understood by those skilled in the art without further description, it being borne in mind that numerous changes may be made in the details disclosed without departing from the spirit of the invention.

I claim:

1. A pressure-type joint for glassware or the like, comprising at least two internally threaded, tubular glass elements, a coupling element of a substantially non-flexible plastics material softer than said glass elements, said coupling element having an annular, radial flange terminating axially at opposite ends in externally threaded nipples, the external threads of respective nipples being of sufficiently reduced dimensions with respect to the internal threads of said glass elements to provide an annular clearance, to permit substantial angular relative movement of said glass elements, and annular seals between the flange of said coupling element and the adjacent ends of the respective threaded areas of said glass elements, said seals, when the joint is assembled and tightened, being of sufficient thickness to provide a longitudinal spacing between the ends of said glass elements and said flange, and being sufficiently compressible when assembled, to accommodate said angular relative movement of the glass elements, while still maintaining a seal.

2. A joint as claimed in claim 2, wherein said glass elements are provided with connecting bells at one end for engagement with said coupling element nipples.

3. A joint as claimed in claim 2, wherein the nipple and glass element threads are respectively dimensioned to provide a threaded engagement of a minimum depth of one-half a thread to thereby provide mechanical thread shear force resistance to effect tight engagement of the respective threads.

4. A joint as claimed in claim 2, wherein said annular, compressible seals are inset in the respective faces of said flange.

5. A joint as claimed in claim 4, wherein said compressible seals are inset in semi-elliptical grooves in the respective faces of said flange.

6. A joint as claimed in claim 4, wherein said seals are inset in grooves in the respective faces of said flange, the outer annular lips of said grooves being longitudinally offset from the corresponding ends of said glass elements to accommodate the angular relative movement of the glass elements.

7. A joint as claimed in claim 5, including annular, compressible seals between the outer ends of said threaded nipples on the coupling element, and the adjacent ends of respective glass elements, at the inner extremities of their connecting bells.

8. A pressure-type joint for the internally threaded end of one tubular element and the complementary externally threaded end of a second tubular element, one of said threaded elements being composed of a substantially non-flexible, plastics material softer than that of the other threaded element, said externally threaded element being provided with a radial flange at the inner extremity of its threaded area, an annular groove in the face of said flange adjacent the threaded end of said other element, said external threads being of sufficiently reduced dimensions with respect to the internal threads of said other element to provide an annular clearance to permit substantial angular relative movement of said elements, an annular seal in said groove, which, when the joint is assembled and tightened is of sufficient thickness to provide a longitudinal spacing between said flange and the end of said other element, and said seal being sufficiently compressible when assembled, to accommodate the relative angular movement of said elements while still maintaining a seal.

References Cited

UNITED STATES PATENTS

| 1,474,375 | 11/1923 | Moore | 285—351 |
| 2,937,891 | 5/1960 | Gressel | 285—390 |
| 3,074,748 | 1/1963 | Ulrich | 285—355 |
| 3,372,949 | 3/1968 | McLay | 285—423 |

FOREIGN PATENTS 877,517  12/1942  France.

REINALDO P. MACHADO, Primary Examiner
W. L. SHEDD, Assistant Examiner

U.S. Cl. X.R.
285—390